United States Patent [19]
Schuplin

[11] 3,874,035
[45] Apr. 1, 1975

[54] HANGER CLIP
[75] Inventor: Jerome T. Schuplin, Parma Heights, Ohio
[73] Assignee: Fastway Fasteners, Inc., Lorain, Ohio
[22] Filed: June 26, 1974
[21] Appl. No.: 483,225

[52] U.S. Cl. .............................. 24/84 H, 248/228
[51] Int. Cl. .......................................... A44b 13/00
[58] Field of Search................ 248/228, 227, 305; 24/84 R, 84 A, 84 B, 84 H; 182/206

[56] References Cited
UNITED STATES PATENTS

| | | |
|---|---|---|
| 2,944,781 | 7/1960 | Masters................................ 248/228 |
| 3,390,856 | 7/1968 | Van Buren...................... 248/228 X |
| 3,463,522 | 8/1969 | Meehan........................... 248/228 X |
| 3,618,176 | 11/1971 | Barnes................................. 24/84 B |
| 3,743,228 | 7/1973 | Drab.................................... 248/228 |

Primary Examiner—Geo. V. Larkin
Attorney, Agent, or Firm—Baldwin, Egan, Walling & Fetzer

[57] ABSTRACT

A hanger clip for attachment to an overhead flanged beam providing means for connecting articles such as conduits, pipes, wires, hangers for suspended ceilings, light fixtures and the like to the beam. The hanger clip includes means for receiving in slip fit relation the flange of the beam for supporting the clip in dependent relation from the beam, together with means co-acting with the slip fit means for resisting withdrawal movement of the clip from the beam flange.

20 Claims, 20 Drawing Figures

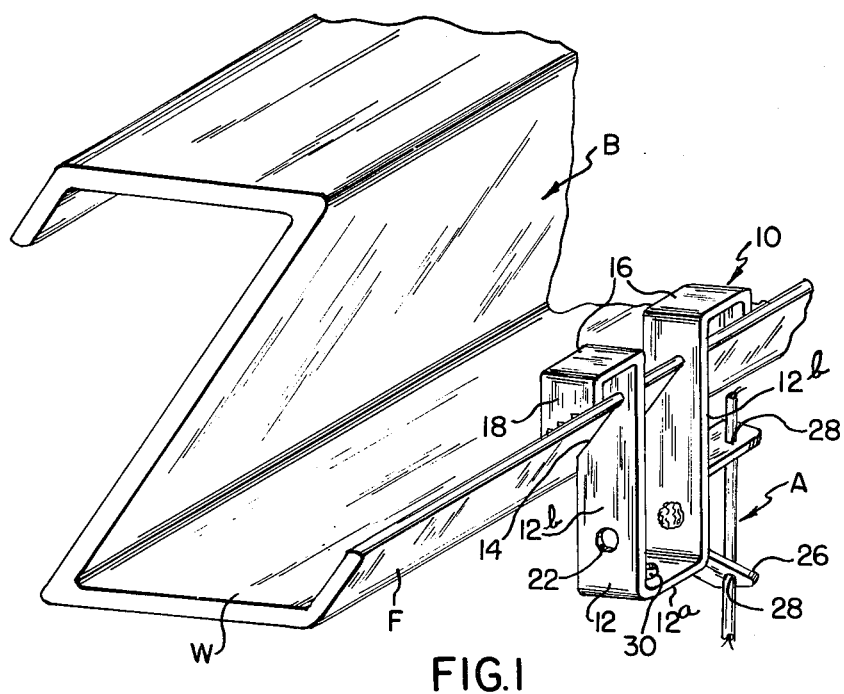
FIG.1
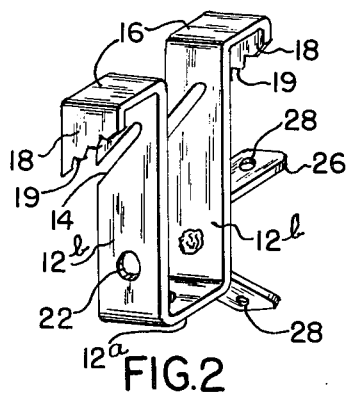
FIG.2
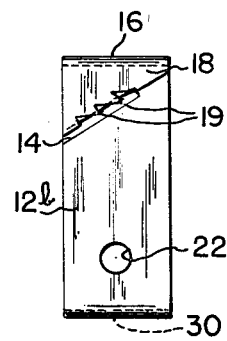
FIG.3
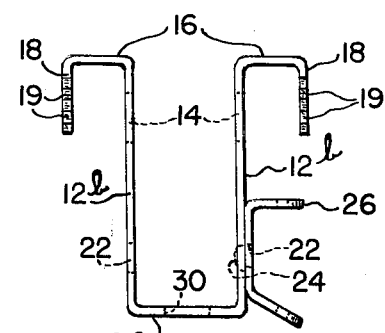
FIG.4
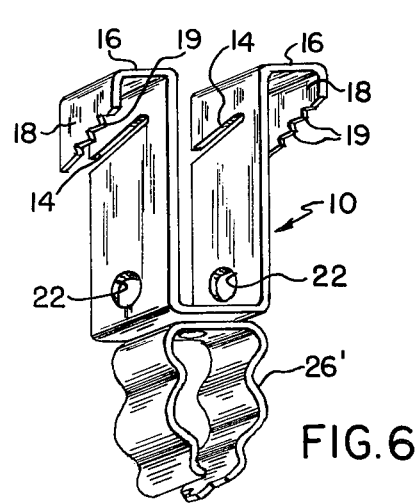
FIG.5
FIG.6

3,874,035

HANGER CLIP

This invention relates in general to a hanger clip adapted for mounting on a flanged beam, and more particularly, to a hanger clip which can be rapidly mounted on the flanged beam and which, when in mounted condition, resists removal therefrom, and expeditiously provides for supporting articles, such as pipes, conduits, hangers, wires, or the like on the beam structure.

BACKGROUND OF THE INVENTION

There are many prior art types of hanger clips adapted for supporting articles, such as conduits, pipes and the like, from beams. U.S. Pat. Nos. 2,944,781 and 3,618,176 issued respectively on July 12, 1960 and Nov. 9, 1971, disclose various types of hanger clips for mounting articles to overhead beams.

SUMMARY OF THE INVENTION

The present invention provides a novel hanger clip which may be expeditiously manufactured in one-piece configuration from, for instance, sheet metal, and which may be rapidly assembled with a flanged beam in depending relation therefrom, and which, when so assembled, effectively resists withdrawal movement of the clip from the beam flange, and which can be adapted to support a variety of articles, such as pipes, wires, conduits, hangers and the like, from the beam.

Accordingly, an object of the invention is to provide a novel hanger clip for mounting on a flanged beam.

A further object of the invention is to provide a hanger clip adapted for mounting on a flanged beam, which can be rapidly slipped onto the beam flange and which, when so mounted, resists unintentional withdrawal movement of the clip from the beam.

A still further object of the invention is to provide a hanger clip of the above type which can be expeditiously adapted to a wide variety of articles to effectively support such articles from the beam, such articles being, for instance, wire, conduit, pipe, hangers for suspended ceilings, light fixtures or the like.

A still further object of the invention is to provide a hanger clip which includes slot means therein for mounting the hanger clip in slip fit relation on the beam flange, with tooth means coacting with the slot means for resisting unintentional withdrawal movement of the hanger clip from the beam.

A still further object of the invention is to provide a hanger clip which is of simplified construction, and which can be economically manufactured from sheet-like material, such as for instance, sheet metal, using mass production techniques.

Other objects and advantages of the invention will be apparent from the following description taken in conjunction with the accompanying drawings wherein:

BRIEF DESCRIPTION OF THE DRAWINGS

FIG. 1 is a fragmentary, perspective illustration of a hanger clip embodying the invention as mounted on the flange of a Z type building beam or purlin, and illustrating the clip supporting an article of wire thereon;

FIG. 2 is a perspective view of the clip of FIG. 1;

FIG. 3 is a side elevational view of the clip of FIG. 2, taken from the left-hand side thereof;

FIG. 4 is a rear end elevational view of the clip of FIGS. 2 and 3;

FIG. 5 is a top plan view of the clip of FIGS. 2 through 4;

FIG. 6 is a perspective view of modified form of the hanger clip, showing a bottom bracket secured thereto for supporting a pipe or conduit article instead of the wire of the clip assembly illustrated in FIG. 1;

FIG. 8 is a perspective view of a further modification of hanger clip showing the latter adapted for use in conjunction with mounting chains, for hanging articles from the clip, such as for instance, light fixtures, signs or the like;

DESCRIPTION OF PREFERRED EMBODIMENTS

Referring now again to the drawings, and particularly to FIG. 1, there is illustrated the preferred embodiment of hanger clip 10 mounted on flange F of beam B. The beam in the embodiment illustrated is of a Z type and could be for instance a purlin of a roof structure of a fabricated building. As illustrated, the lower edge flange F of the beam B is generally disposed obliquely with respect to the plane of the bottom web W of the beam.

Figure 14:
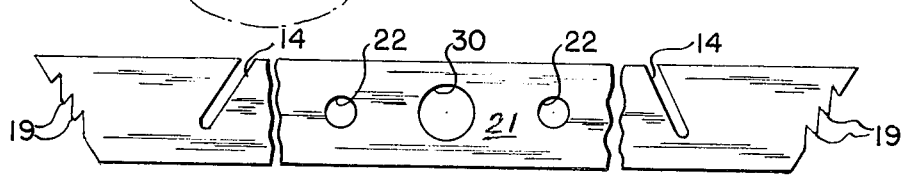
FIG. 14 is a plan view of a blank prior to being bent into a clip of the general type illustrated in FIGS. 1 through 12.
Figure 15:
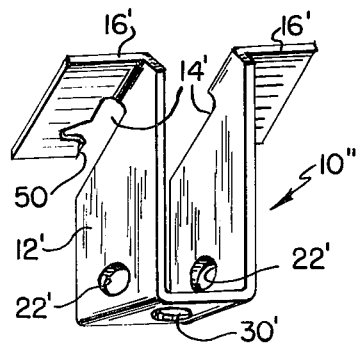
FIG. 15 is a perspective view of another embodiment of hanger clip.

The clip 10 is preferably formed of some bendable or formable sheet-like material, such as for instance sheet metal, and may be stamped or cut in a one-piece blank (FIG. 14) and subsequently bent into the configuration illustrated for instance in FIG. 1. The clip comprises a body 12 including a base web 12a and side webs 12b, formed into a generally U-shaped configuration, and with the webs 12b having diagonally arranged slots 14 opening onto the exterior of the body 12, and adapted to receive in slip-fit relation therein the aforementioned complementary diagonally oriented flange F of the beam B.

Projecting laterally from each of the side webs 12b and disposed generally in a plane substantially perpendicular to the plane of the respective of side web 12b is a flange or wing portion 16, which flange portions are disposed above the associated slot 14 in each of the respective side webs 12b. Depending from the distal end of each flange portion 16 and in a plane substantially parallel to the plane of the associated side web 12b, are gripping or retaining means 18.

As can be best seen in FIG. 3, the gripping means 18 comprise teeth 19 which project into or just past the lengthwise plane of the associated slot 14 (FIG. 3) so that when the clip is mounted in assembled relation on the flange F of the beam B, the pointed teeth 19 will grip the confronting surface of the flange (FIG. 1) and resist withdrawal movement of the clip from the beam. In this connection the flange portions 16 of the clip are preferably of a generally resilient nature, so that they can be forced upwardly during assembly of the clip on the beam, and also to release the gripping coaction of the teeth means with respect to the flange F of the beam B, and thus facilitate removal of the clip from the beam, if such removal becomes necessary or desirable. for instance, removal can be readily accomplished by inserting a tool, such as a screwdriver or the like beneath the web or flange portion 16 and forcing it away from the flange F of the beam. Moreover, the points on the teeth preferably project generally rearwardly, as shown, to facilitate sliding assembly of the clip on the beam.

The blank 21 (FIG. 14) from which the clip may be formed, and the clip itself when so formed, may be provided with openings 22 in the side webs 12b thereof. The openings are adapted to receive a fastener, such as a rivet or stud 24 coacting with a bracket 26, with a rivet being deformed for securing or holding the bracket 26 to the clip body 12. The bracket may have openings 28 therein (FIG. 2) through which may extend a wire, rod, conduit, or the like for supporting the wire article A on the clip, and thus mounting the article to the beam B. It will be understood that the bracket 26 may be of any suitable configuration and is not necessarily restricted to the type of bracket configuration 26 illustrated in the drawings. However, for purposes of attaching wire to the beam, the bracket 26 illustrated is of the preferable configuration.

The base web portion 12a of the clip 10 may also include an opening 30 therein for likewise attaching other article supportive means, such as for instance the bracket 26' illustrated in FIG. 6 which bracket 26' comprises a resilient gripping member adapted for supporting for instance pipe, or conduit, on the clip. In other respects, the clip of FIG. 6 is generally identical to that of the first described embodiment of FIGS. 1 through 5. It will be understood that the brackets 26,26' may be stationarily secured to the clip body or may be so secured that they can be rotated with respect to the clip for selective positioning of the respective bracket to the desired path for the supported article.

Figure 7:
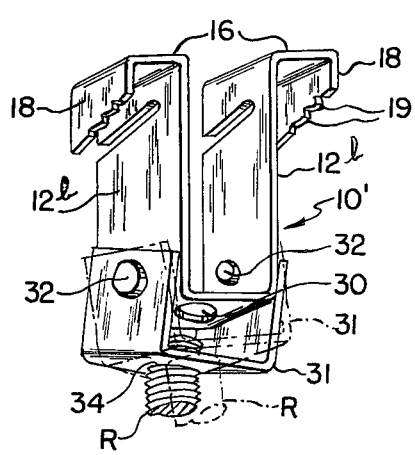
FIG. 7 is a perspective view of a further modification of hanger clip illustrating a swingable bracket coupled to the clip body for supporting a threaded hanger, such as for instance a threaded rod.

Referring now to FIG. 7, there is shown a modification of clip wherein the basic clip structure 10' is generally similar to that of the first described clip of FIGS. 1 through 5 and FIG. 6, but wherein in this clip combination, a swivel bracket 31 is provided, swiveled or pivoted to the body 12 of the clip at pivots 32, and through the aforementioned openings 22 in the side webs 12b of the clip. The swivel bracket 31 is preferably provided with a threaded opening 34 in the base thereof, through which is adapted to coact in threaded coaction a threaded hanger rod R. The threaded rod R can be used for instance in suspending false ceilings from the beam B or can be used in suspending other instrumentalities, such as for instance, lights, fixtures and the like.

Figure 8:
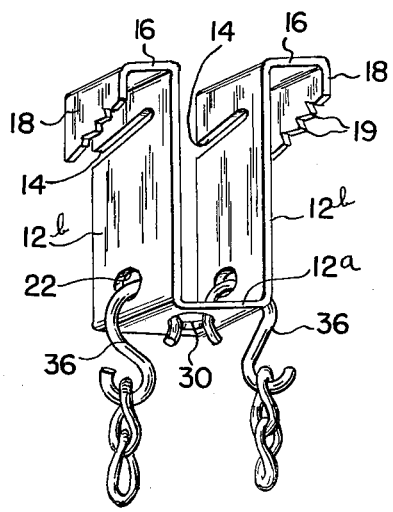

FIG. 8 illustrates a clip of the general type of that illustrated in FIGS. 1 through 7, but wherein the openings 22,30 through the respective side and bottom webs 12b,12a, have chain hooks 36 passed therethrough for attaching or suspending articles, such as for instance a light fixture from the clip, thus supporting the light fixture on a beam B.

Figure 9:
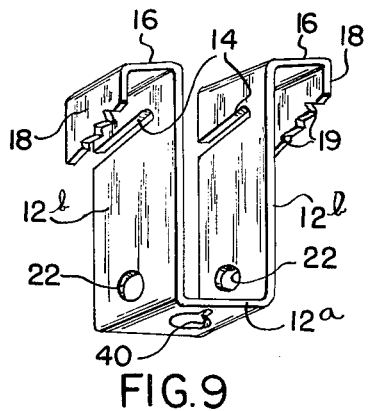
FIG. 9 is a perspective view of a further modified form of hanger clip illustrating an integral nut thread formed on the bottom web thereof.
Figure 10:
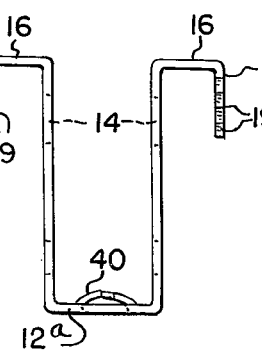
FIG. 10 is a rear end elevational view of the clip of FIG. 9.
Figure 11:
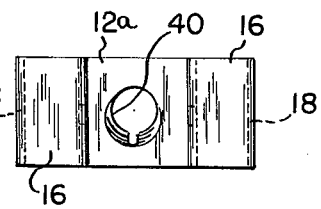
FIG. 11 is a top plan view of the FIGS. 9 and 10 clip.

FIGS. 9, 10 and 11 illustrate a further modification of clip wherein the bottom web 12a thereof includes a formed nut thread 40 stamped or formed from the material of the web 12a, and adapted to be received in threaded coaction, a threaded member such as a threaded rod or threaded fastener member.

Figure 12:
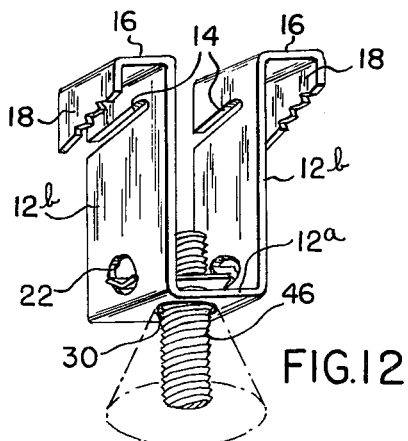
FIG. 12 is a perspective view of another modified form of hanger clip wherein provision is made for swingably mounting a threaded member, such as a threaded rod, thereon by means of a movable or swingable separate nut member.
Figure 13:
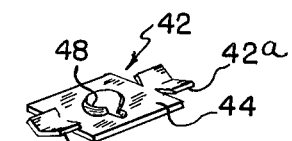
FIG. 13 is a perspective view of the separate nut member of the FIG. 12 assembly.

FIGS. 12 and 13 illustrate a further modification of clip, wherein the aforementioned openings 22 in the side webs 12b, support a movable nut member 42 (FIG. 3). Nut 42 has wings 42a extending laterally from the body portion 44 thereof and which are received in the respective opening 22 in the respective side web 12b, thus supporting the nut member 42 in movable relation with respect to the clip body 12. A threaded member such as a threaded bolt 46 may be disposed in threaded coaction with a formed thread 48 on the nut body 44, to movably mount the threaded member 46 with respect to the clip body 12. As can be readily seen, since the wings 42a of the nut 42 are movable within the limit of the respective opening 22, that the threaded member can be moved through a range illustrated by the phantom lines in FIG. 12. The nut 42 can be conveniently formed from, for instance, sheet metal, with the integral thread impression 48 stamped or cut therefrom. Such an arrangement can be utilized in suspending various articles from an associated beam B, and could be used for instance in suspending false ceilings or the like from another beam.

Figure 16:
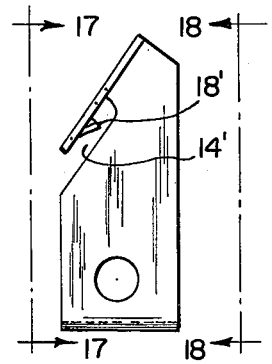
FIG. 16 is a side elevational view of the FIG. 15 clip.
Figures 17, 18:
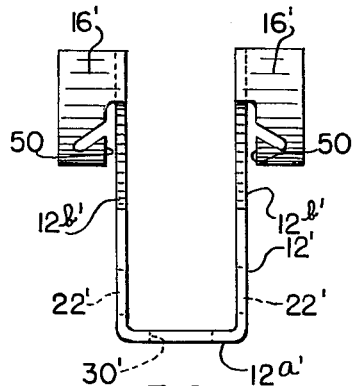
FIG. 17 is a front end elevational view taken generally along the plane of line 17—17 of FIG. 16, looking in the direction of the arrows.
FIG. 18 is a rear end elevational view taken generally along the plane of line 18—18 of FIG. 16, looking in the direction of the arrows.
Figure 19:
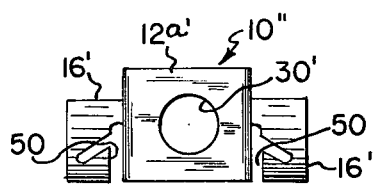
FIG. 19 is a bottom plan view of the clip of FIGS. 15 through 18.
Figure 20:
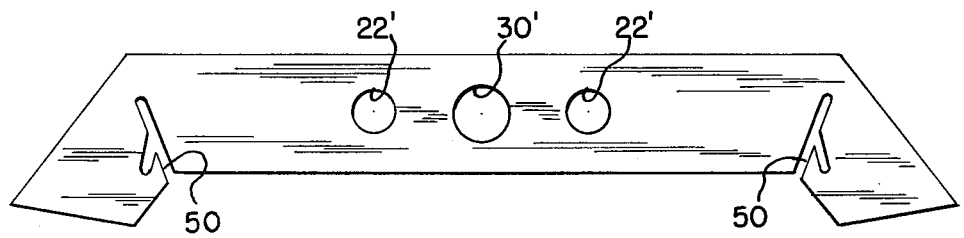
FIG. 20 is a plan view of a blank of sheet material prior to being bent into the clip of FIGS. 15 through 19.

Referring now to FIGS. 15 through 20, there is shown a further embodiment of clip. In this form of clip 10'', the body 12' in end elevation is again of generally U-shaped configuration, however, with the slots 14' being located generally at the juncture of the lateral flange portions 16' with the body 12'. The tooth means 18' in this embodiment for resisting withdrawal movement of the clip from the beam flange comprises a point or projection 50, formed from the material of the respective flange 16' and bent or directed out of the plane thereof, as best shown in FIG. 16, so that such tooth means 18' will be in a position for resisting withdrawal movement of the clip from the flange F of the beam B.

The flanges 16' are preferably generally resilient so that the clip flange can be moved up away from the flange F of the beam when installed thereon when it is necessary or desired to remove the clip 10'' from the beam. Such a clip can be readily formed from a flat blank (FIG. 20) of sheet metal, similarly to the first described clip embodiment. It will be noted that in this arrangement the flanges 16' are disposed obliquely with respect to the horizontal. The openings 22', 30' can be formed in the respective side and bottom web of the clip body for similar purposes aforedescribed in connection with the previously described embodiments of clip. In other words, such openings can be used to support or couple articles such as brackets or chains or the like thereto, for supporting articles on the beam via the clip.

From the foregoing description and accompanying drawings, it will be seen that the invention provides various arrangements of hanger clips adapted for attachment to flanged beam members or the like, and providing an expeditious means for connecting articles to the beam. The hanger clip includes means for receiving the beam flange in slip fit relation, together with means coacting with the slip fit means for providing gripping or holding the beam, and resisting withdrawal movement of the clip member from the beam flange. The clip member has means for securing articles thereto, such as for instance, conduits, pipes, wires, hangers for suspended ceilings, light fixtures and the like.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

What is claimed is:

1. In a hanger clip adapted for mounting on a flanged beam or the like comprising, a body having means on said body for receiving in slip-fit relation the flange of the beam for supporting said clip in generally depending relation therefrom, means coacting with the first mentioned means adapted for gripping the beam flange and resisting withdrawal movement of the clip from the beam flange, and other means on said body for attaching thereto article supportive means.

2. A clip in accordance with claim 1 wherein said body comprises a generally U-shaped in end elevation, member.

3. A clip in accordance with claim 2 wherein said gripping means are disposed laterally of the first mentioned means.

4. A clip in accordance with claim 1 wherein the first mentioned means comprises a slot in said body opening onto the periphery thereof for receiving therein the beam flange in said slip-fit relation.

5. A clip in accordance with claim 1 wherein said body comprises a generally U-shaped configuration in elevation including generally laterally projecting body flanges and teeth means on each of said body flanges comprising said gripping means for resisting withdrawal movement of the clip from the beam flange, said teeth means projecting out of the plane of the respective body flange.

6. A clip in accordance with claim 5 wherein said flanges are generally cantilevered to said body for facilitating sliding movement of said teeth means relative to the beam flange during mounting of the clip on the beam.

7. A clip in accordance with claim 5 wherein said teeth means are so constructed and arranged that they are operative to prevent withdrawal movement of the clip from the beam flange in one direction but facilitate entry of the beam flange into the first mentioned means, in the opposite direction, said first mentioned means comprising laterally spaced parallel extending slots in said body.

8. A clip in accordance with claim 5 wherein said flanges are disposed in oblique planes with respect to the horizontal.

9. A clip in accordance with claim 1 wherein said other means includes an aperture in said body, and means coacting with said aperture and attaching bracket means to said body for fastening an article, such as for instance a wire to said body.

10. A clip in accordance with claim 1 wherein the first mentioned means comprises a slot extending obliquely with respect to the horizontal and opening onto the exterior of said body for receiving a complementary obliquely extending beam flange.

11. A clip in accordance with claim 1 wherein said other means comprises means for attaching a bracket to said body, and a bracket secured to said body via said attaching means and including a fastener securing the bracket to said body, said bracket having openings therein through which is adapted to extend an article, such as for instance a wire, for supporting the latter via said clip on the beam.

12. A clip in accordance with claim 1 in combination with an article attaching bracket, and wherein said bracket is attached to said body by fastener means extending through an opening in said body and coacting between said body and said bracket.

13. A clip in accordance with claim 12 wherein said bracket is pivoted to said body at spaced points by said fastener means for swinging movement of the bracket with respect to said body, and means on said bracket formed from the material thereof adapted to support an article, such as for instance a threaded hanger rod, on said bracket.

14. A clip in accordance with claim 1 including nut means mounted on said body and adapted to receive a threaded hanger member in supporting coaction therewith, for mounting the threaded hanger member on the body.

15. A clip in accordance with claim 14 including a threaded hanger member coacting with said nut means in threaded coaction and mounting the threaded hanger member on said clip.

16. A clip in accordance with claim 14 wherein said nut means is swingably coupled to said body for permitting swingable movement of said nut means with respect to said body, and thus swingable movement of the threaded hanger member with respect to the body.

17. A clip in accordance with claim 16 wherein said means mounting said nut means on said body comprises openings in said body, receiving therethrough wings on said nut means in relatively movable relation, for movably mounting the nut means on said body.

18. A clip in accordance with claim 16 wherein said nut means comprises a sheet metal nut having thread means formed thereon from the material of the nut, said body having laterally spaced openings therein, and said nut having laterally projecting wings received in said openings in movably supported relation and swingably mounting said nut on said body, said body having an opening disposed below said nut and through which is adapted to extend the threaded hanger member in spaced relation to said body for providing for movable positioning of the threaded hanger member relative to said body.

19. A clip in accordance with claim 1 wherein said body is of U-shaped configuration in end elevation and has laterally projecting wings thereon, and said gripping means comprising teeth formed from the material of said wings and extending out of the plane of said wings.

20. A clip in accordance with claim 1 wherein said body is of U-shaped configuration in end elevation and has laterally projecting wings, and teeth means projecting from said wings in a direction generally perpendicular to the plane of said wings and forming said gripping means.

* * * * *